Figure 1A:
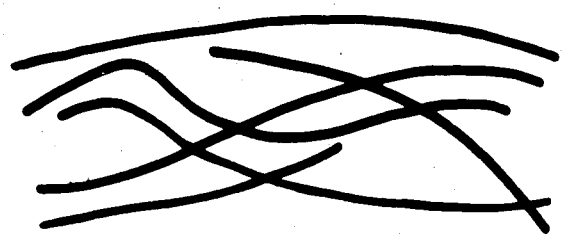

Oct. 13, 1964     E. KUNTZ     3,152,976
PREPARATION OF COLLAGENOUS MATERIALS
Filed Sept. 21, 1961     2 Sheets-Sheet 1

0.03% Collagen Fibril unheated 0.03% Collagen Fibrils heated at 60°C for 20 Mins.

0.03% Collagen Fibrils heated at 60°C for 38 mins.

0.03% Collagen Fibrils treated with Riboflavin-5-Phosphate Unheated

INVENTOR.
Eloise Kuntz
BY

ATTORNEY 0.03% Collagen Fibrils
treated with
Riboflavin-5-Phosphate
heated at 60°C
for 40 Mins.

0.4% Collagen
Fabrils unheated 0.4% Collagen Fibrils
treated with
Riboflavin-5-Phosphate
Unheated.

0.4% Collagen Fibrils
treated with
Riboflavin-5-Phosphate
heated at 60°C
for 40 Mins.

INVENTOR.
ELOISE KUNTZ
BY

ATTORNEY 3,152,976
PREPARATION OF COLLAGENOUS MATERIALS
Eloise Kuntz, Somerville, N.J., assignor to Ethicon, Inc., a corporation of New Jersey
Filed Sept. 21, 1961, Ser. No. 141,565
20 Claims. (Cl. 204—158)

This is a continuation-in-part of application Serial No. 305, filed January 4, 1960, which in turn is a continuation-in-part of application Serial No. 774,612, filed November 18, 1958, which in turn is a continuation-in-part of application Serial No. 699,523, filed November 29, 1957, each of which is now abandoned.

This invention relates to polymerization products of fibrous proteins. More particularly, the present invention is concerned with dye-photocatalyzed collagenous polymers and methods for their preparation.

Collagen, a proteinaceous substance present in the white connective tissue of animals, has long been employed as raw material for the preparation of leathers and surgically useful articles such as sponges, films, fibers, filaments, etc. The conversion of collagen into utilitarian forms requires a tanning step wherein an agent combines with collagen, more or less reversibly, transforming the collagen into a fixed form. Tanning agents which are commonly used in the collagen field include formaldehyde, glyoxal, chrome and vegetable tannins. All of the known tanning agents have one common property with respect to their tanning ability on collagen—they not only participate in the tanning reaction, but also become an integral part of the final tanned product. Chrome, for instance, may be a constituent of the final product to the tenure of up to 5% or more; vegetable tannin of up to 50% or more; formaldehyde of up to several percent; oil tannins of up to 10%. Conventional tanning agents combine with various active groups of the peptide chain as carboxyl, amino and hydroxyl groups to form bridges between or along these chains anchored by various types of bonds, including hydrogen, covalent and salt bonds.

Among the methods currently employed for converting collagen into useful articles is the process which comprises preparing an aqueous acid dispersion of collagen tissue and precipitating the collagen by the addition of alkali such as ammonium hydroxide. The precipitated collagen is then converted to the desired article by appropriate dehydration procedures, as for example, by evaporation of water to prepare a film, or by spinning to prepare a fiber or filament. Tanning agents are incorporated during or after formation of the article.

Articles prepared according to the above-described process are based on the conversion of collagen to a dispersion wherein the collagen is in a fibrillar state rather than a molecular dispersion and attraction between fibrils is limited to weak and easily ruptured forces such as Van der Waals forces and hydrogen bonds. Articles prepared from such dispersions have a relatively low break strength. Essentially, therefore, the methods heretofore employed are predicated on the breaking of collagen tissue with mild acid media and its subsequent reconstitution into newly-formed bundles of fibrils by means of alkali or dehydrating agents, usually followed by treatment for stabilization with agents such as the previously mentioned tanning agents.

It has now been discovered that novel, thermostable, irreversibly cross-linked collagenous polymers can be prepared by irradiating collagenous substances such as collagen, per se, derivatives of collagen and collagen degradation products in the presence of a dye. The novel polymers are distinguishable from known tanned collagenous products in that the dye is employed solely as a catalyst to induce cross-bonding reactions between amino acids of adjacent collagen chains, and, therefore, does not become chemically integrated with the final product. Thus, collagenous polymers are obtained which are structurally free from the dye which photocatalyzed their formation.

Although the mechanism of polymer formation cannot be postulated with certainty, the dye is believed to photocatalyze the formation of a charge transfer complex between the photocatalyst and two amino acids of adjacent protein chains, to give a high order of cross-linking resulting in the formation of novel collagenous polymers. The dye then extracts electrons from the amino acids, leaving them bound together by a covalent bond. Experiments indicate that films, filaments, fibers and sponges made from collagenous starting materials cross-linked in this manner possess properties characteristically different from articles formed from collagenous starting materials not so treated. Such cross-linked products have a higher tensile strength, lower water retention, less shrinkage on heating in water at 100° C., and less swelling in water than similar bodies formed without such treatment. Stress-strain analyses, viscosity and syneresis measurements indicate that the cross-linking is such that the collagenous polymers have increased thermostability and are much greater in size than their precursors.

In order that the nature of my invention may be more easily understood, reference is made to the accompanying drawings wherein:

FIGURES 1a through 8a are schematic representations of collagen dispersions under a phase microscope at 500 magnifications.

Figure 2A:
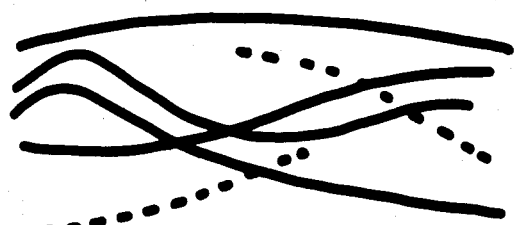
Figure 3A:
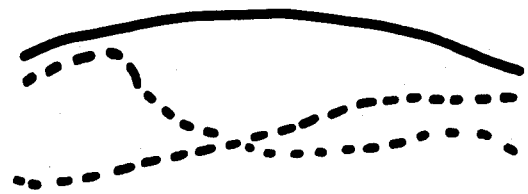
Figure 4A:
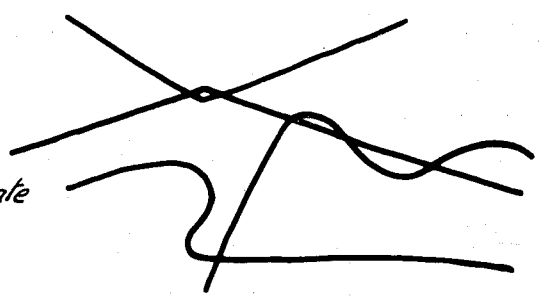
Figure 5A:
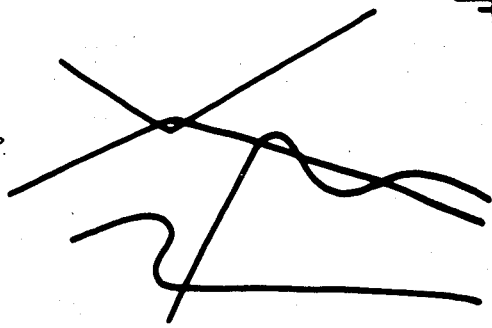
Figure 6A:
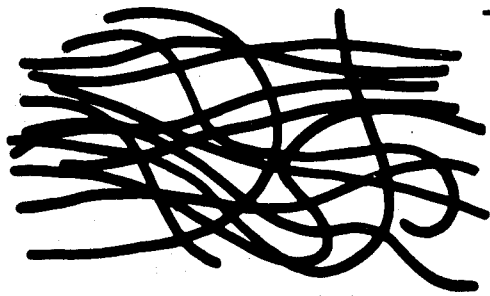
Figure 7A:
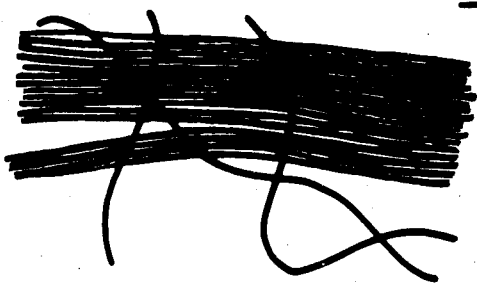
Figure 8A:
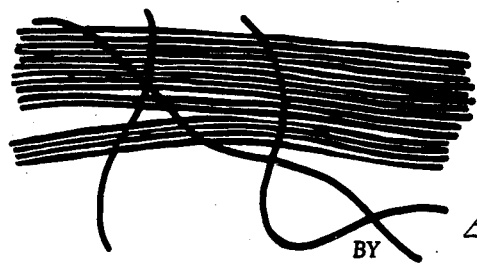

Referring again to the drawings, FIGURE 1a shows a 0.03% unheated collagen dispersion in 0.001 N aqueous acetic acid wherein all fibrils are intact and randomly dispersed. FIGURE 2a shows a 0.03% collagen dispersion in 0.001 N aqueous acetic acid following heat treatment at 60° C. for twenty minutes with a substantial decrease in the number of intact fibrils. FIGURE 3a shows a 0.03% collagen dispersion in 0.001 N aqueous acetic acid followed by heat treatment at 60° C. for thirty-eight minutes with nearly complete resolution of the fibrils indicating that, with time, untreated fibrils are broken down, i.e., are not thermostable. FIGURE 4a shows a 0.03% unheated collagen dispersion in 0.001 N aqueous acetic acid irradiated in the presence of riboflavin-5-phosphate wherein the fibrils have random orientation and are well separated. Irradiation in the presence of the dye has caused linkage formation within the fibrils themselves. FIGURE 5a shows a 0.03% collagen dispersion in 0.01 N aqueous acetic acid irradiated in the presence of riboflavin-5-phosphate following heat treatment at 60° C. for forty minutes, showing that fibrils previously irradiated in the presence of the dye remained intact on heating, thus demonstrating the thermostability of the fibrils. FIGURE 6a shows a 0.4% unheated collagen dispersion in 0.01 N aqueous acetic acid wherein the fibrils are randomly oriented but in comparison with FIGURE 1a are closer together because of their higher concentration. FIGURE 7a shows a 0.4% unheated collagen dispersion in aqueous 0.01 N acetic acid irradiated in the presence of riboflavin-5-phosphate with alignment of fibrils due to cross-linking. Because of the submicroscopic character of the cross-links, these are not schematically depicted, but their presence is manifest from the oriented nature of the fibrils. FIGURE 8a shows a 0.4% collagen dispersion in 0.01 N acetic acid irradiated in the presence of riboflavin-5-phosphate followed by heat treatment at 60° C. for forty minutes showing that fibrils in the dispersion have suffered no change in orientation despite extensive heat treatment, indicating the thermostable character of the bonds linking them together.

Although physical-chemical properties similar to those just described may be obtained by processes of the prior art generally known as "tanning," the final cross-linked collagenous polymers resulting from the present invention are (in contrast to the prior art) entirely free from the dye photocatalyst which effected the polymerization. In this respect, the novel polymer differs from tanned collagenous products, i.e., the latter contain, as an integral part of the final structure, substantial quantities of the tanning agents used to promote the reaction. The freedom of the novel polymers from the cross-linking agent is considered of particular importance in the light of biological considerations, i.e., its use in the fields of medicine, surgery, or for food purposes.

According to the present invention, the conversion of native collagen to the novel polymeric thermostable products is accomplished by the exposure of these starting materials to irradation, either artificial or natural, in the presence of a dye. Since this fundamental discovery embraces a wide variety of permutations and modifications, it is intended that these be included within the scope of the present invention.

In one of its embodiments, the novel process comprises, in a general way, the preparation of a collagenous gel in which the collagenous substance, i.e., the collagen derivative, degraded collagen or, preferably, collagen is converted to a polymerized, cross-linked form by exposing an acid dispersion of the collagenous starting material to irradiation in the presence of a photosensitive dye. The gel of polymerized collagenous material is then shaped to the desired form, e.g., evaporation, neutralization or dehydration. The cross-linked gel is so bonded that articles made from its possess distinctively high tensile strength and rapid in vivo absorption time, as well as rapid in vitro digestion rate. More specifically, films and fibers made from such gel are characterized by high break strength, low swelling in water, low shrink temperature and rapid degradation by proteolytic enzymes. Sponges prepared from such gel are characterized by being not readily redispersible in water and being rapidly absorbable in vivo.

In accordance with the preferred embodiment of this invention, the acid dispersion is shaped and reconstituted to the desired form, i.e., by neutralization or dehydration, and the reconstituted collagenous product in situ or rewetted with water if previously dried, is subjected to the dye photocatalyst reaction. In other words, irradiation in the presence of the dye may accompany or follow the neutralization, and complete or incomplete dehydration, and/or evaporation.

The term "collagenous" material as applied in accordance with this invention to the starting materials and to the corresponding polymeric final products is intended to embrace collagen itself, that is to say, the protein commonly known as forming the chief constituent of connective tissue and the organic substance of bones, as well as collagen derivatives, collagen degradation products and collagen extracts.

One may therefore employ as a starting material collagen in any of its forms, i.e., native, fibrous collagen of tendon, hide, gut, fish swim bladder (ichthyocoll); dissolved collagen in the molecular state; dispersed collagen in the fibrillar state or collagen reconstituted to the solid fibrous state from molecular or fibrillar states. In practice, the native or reconstituted collagen is immersed in, or the dispersed or dissolved collagen is added to, as the case may be, a solution of a dye and the preparation is irradiated under conditions insuring adequate light penetration, after which shaped articles are formed. Such articles are conveniently made from the resulting polymer according to methods known to those skilled in the art and generally discussed herein.

The term "collagen degradation product" as used in this invention is intended to embrace partially degraded collagen, such as, for example, gelatin obtained from collagen, preferably of high molecular weight with Bloom of 205 or greater.

Collagen derivatives such as native collagen whose available side groups have been esterified by alcoholysis are also suitable collagenous starting materials for the preparation of the novel polymers of this invention. The certification is suitably accomplished with an alkanol having frrom about 1 to about 20 carbon atoms, preferably a lower alkanol such as methanol, ethanol, propanol, butanol, pentanol, hexanol, iso-pentanol, iso-hexanol, etc. in the presence of a dilute inorganic acid such as sulfuric, hydrochloric, phosphoric, etc. The esterified collagen so obtained is then dispersed in aqueous solution, and subjected to irradiation in the presence of a dye. The resulting gel is reconstituted by evaporation to the desired form. Alternatively, the esterified collagen may be directly reconstituted and the resulting product then subjected to the irradiation process.

Because the photocatalytic reaction of this invention induces a charge transfer mechanism within the collagenous starting materials, it is possible, by means of this reaction, to introduce a wide variety of moieties into the starting materials simultaneously, in situ, during their photocatalytic transition into collagenous polymers. The charge transfer is induced by the dye photocatalyst which is capable of utilizing light energy to remove electrons from a large number of organic substances, thus creating covalent bonds suitable either for polymerization of the collagenous starting material itself, or formation of copolymers of collageneous materials with other substances or, as is usually the case, both.

An extremely wide variety of substances may be used for participating in the charge transfer reaction of this invention, the only limitation on the character of the material to be employed being that it should have atoms or radicals capable of donating electrons to the light activated dye. Among substances which are suitable for this purpose, are those having one or more of the following groups within their structure: amino, hydroxyl, guanidyl, amido, imido, imino, sulfhydryl, ether linkages, aldehydo, keto and functional derivatives thereof. More specifically, one may employ for this purpose amino acids such as glycine, alanine, serine, threonine, valine, leucine, isoleucine, norleucine, phenylalanine, tyrosine, cysteine, cystine, methionine, tryptophane, proline, hydroxyproline, aspartic acid, glutamic acid, histidine, arginine, lysine, hydroxylysine, citrulline, etc.; nucleic acids and nucleoproteins; carbohydrates, including monosaccharides, e.g., hexoses such as glucose, fructose, galactose and mannose; pentoses such as arabinose, xylose, ribose, rhamnose, and desoxyribose; disaccharides such as maltose, lactose, sucrose, gentobiose, isomaltose and cellobiose; trisaccharides such as raffinose; and polysaccharides such as starch, inulin, glycogen, dextrin, cellulose, pectin, etc.

As used in this invention, "dyes" are chromophore-containing compounds capable of complexinng with collagenous materials. A wide variety of substances possessing these properties may be employed in accordance with this invention, provided only that they meet the minimum requirements specified. Obviously, inclusion of a chromophore group in the structure is essential if light absorption is to be effected. The feature of complexation is one which can be readily ascertained by simple experiment.

Although it is preferred to use a dye which forms a weak, readily reversible complex with collagenous materials (in order to facilitate easy removal, if so desired), dyes which form relatively strong and stable complexes may be employed in cases where retention of a color in the final product is unobjectionable or desirable. Preferred for this purpose are the compounds belonging to the isoalloxazine class, more especially, the 6,7-(R,R$_1$)-9-(1'-X) isoalloxazines where R and R$_1$ are, interchangeably, hydrogen atoms or lower alkyl groups such as methyl, ethyl, propyl, isopropyl, butyl, isobutyl, pentyl or isopentyl radicals and X is ribityl, phosphoribityl, mono- or polyacetoribityl, or malonyl, or the water soluble salts and dinucleotide derivatives thereof. A preferred specific example for use as the photocatalyst is riboflavin-5-phosphate, although riboflavin is equally suitable.

It is to be understood that a large number of other dyes, i.e., chromophore-containing substances capable of complexing with collagenous materials, may be employed such as those falling within, but not necessarily limited to, the following groups: tetrazoliums such as 2,3,5-triphenyltetrazolium chloride; pteridines such as 2,4-(1H,3H)-pteridinedione (lumazine); pterines such as xanthopterin; azo such as 4,4'-bis-[7-(1-amino-8-hydroxy-2,4-disulfo)-naphthylazo]-3,3'-bitolyl tetra-sodium salt (Evans Blue); azines such as aminodimethylaminotoluaminozine hydrochloride (neutral red); 3,7-diamino-5-phenylphenazinium chloride (phenosafranin); and tetra-ethyl phenosafranin (amethyst violet); thiazines such as 2-amino-7-dimethylamino-1(or 3)-methylphenazathionium chloride (toluidine blue O); 3-methylamino-7-dimethylaminophenazathionium chloride (Azure B); 3-amino - 7 - dimethylaminophenazathionium chloride (Azure A); 2,7-diaminophenazathionium chloride (thionine); 8-nitro-2,7-bis-dimethylaminophenazathionium chloride (methylene green); 3,7-bis-(dimethylamino) phenazathionium chloride (methylene blue); indamines such as Bindschedler's Green; oxazines such as 7-oxo-phenoxazon-(2)-10-oxide (resazurin); acridine such as 3,6-diaminoacridinium chloride hydrochloride (proflavine); 2,7-dimethyl-3,6-diaminoacridinium chloride hydrochloride (acridine yellow); 3,6-bis-(dimethylamino-acridinium chloride hydrochloride (acridine orange); triphenylmethane such as zinc, oxalate, or ferric double chloride of tetramethyl para - aminotriphenylcarbinol (Malachite green); fluoranes such as 9-(o-carboxyphenyl)-6-hydroxy-3-isozathenone (fluoroescein); the sodium or potassium salt of tetra-iodo-fluorescein (erythrosine); the sodium or potassium salt of tetra-bromofluorescein (eosin Y); 9-(tetrachloro-o-carboxyphenyl - 6 - hydroxy - 3 - isozathenone (rose bengal); pyronines such as 3,6-bis-(methylamino)-pyroninium chloride hydrochloride (acridine red 3B); and thiazoles such as 2-(p-aminophenyl)-6-(6'-methylbenzothiazole)-benzothiazole (primulin).

Depending upon the starting material employed, the hydrogen ion concentration during irradiation may be varied widely from a pH of about 2.0 to about 14.0. In the case of an acid dispersion, desirable results are obtained when the irradiation is carried out under acid conditions; that is to say in the pH range from about 2.0 to about 4.5, preferably from about 3.0 to about 4.5. If the reconstituted form of collagen is employed, the pH may be on the alkaline side, i.e., from about 5.0 to about 14.0, preferably from about 9.0 to about 11.0.

The photocatalysis proceeds smoothly with relatively small quantities of catalyst as well as with larger quantities. Therefore, the only limitation as to the amount of dye which may be employed will be that circumscribed by the solubility of the particular compound used. Experience indicates that quantities of dye ranging from about 0.2 mg. to about 50 mg. for each 100 grams of dispersion are satisfactory, and that optimal results are obtained with quantities of about 50 mg. of dye for each 100 grams of dispersion. In the case of reconstituted or native collagen one may employ from about 1 mg. percent to 100 mg. percent, optimally about 5 mg. percent, dye in the immersion bath.

The time requirement for ensuring completion of the reaction with a given concentration of photocatalyst varies considerably depending upon the wave length and intensity of irradiation, as well as the purpose for which the polymer is intended to be used. In general, however, it has been found that suitable polymers are obtained with as little as two seconds' exposure to irradiation and as much as several days' exposure, depending upon the concentration of photocatalyst, the pH and the state of the collagenous material, as well as the intensity and wave length of light. In practice, a satisfactory period of time for polymerization to take place is from a few, e.g., two or three, seconds up to several, e.g., forty-eight, hours although this is not to be construed as an absolute limiting factor. Variations in light intensity and time appear unlimited except for factors having detrimental effects on the collagenous material.

The most effective wave length of light is in that range of the electromagnetic scale which is maximally absorbed by the photocatalyst, i.e., the ultraviolet and visible light regions represented in the range of from about 2500 to about 7000 Angstrom units. Optimal results are obtained at wave lengths most strongly absorbed by the given dye. For example, in the case of isoalloxazines, optimal results are obtained at about 3600 Angstrom units in the ultraviolet range, and about 4600 Angstrom units in the visible region. The source of visible light may be either natural, i.e., sunlight, or artificial, i.e., emanating from an arc lamp, fluorescent bulb or similar device. The process is operative at a light intensity varying from about 10 foot candle power to about 13,000 foot candle power, the latter being equivalent to the intensity of sunlight. A general rule which may be followed is that the intensity employed is directly proportional to the time required for the polymerization reaction to reach completion. Thus, the higher the intensity of the light, the shorter will be the time requirement, and vice versa. If the operation is carried out at a relatively intensive range of foot candle power, e.g., sunlight for a protracted period of time, precautions must be taken to keep the reaction mixture at a temperature sufficiently low to preclude denaturation of the collagenous material and change in its configuration. Since denaturation of dispersed collagen takes place usually at about 37° C., temperatures in excess of this are preferably not employed with dispersed collagen, although a temperature of about 40° C. maximum may be used in cases where exposure to irradiation is only for a brief period of time. If reconstituted or native collagen is used, temperatures below 60° C. are preferably employed.

The concentration of collagenous material in the acid dispersion or aqueous solution employed as starting material for forming reconstituted collagenous polymers may be varied over wide limits, in some cases from 0.01% collagenous substance on a weight/volume basis up to about 2% to 5% but in others considerably higher. For example, it may be desirable in some cases to prepare a relatively thick dispersion, i.e., where the polymer is intended for use in the preparation of a film. Under such circumstances, the operation may be carried out in media having collagenous concentration in the order of 80–95%. This may be accomplished by first dissolving the photocatalyst in the acid dispersion or solution, concentrating such dispersion or solution by a suitable method, e.g., evaporation, and then subjecting the concentrate to irradiation. In actual practice a convenient concentration suitable for most purposes is from about 0.2% to about 5%. Since it is necessary to have the photosensitive catalyst completely dispersed in the medium while at the same time preventing cross-linking until the desired stage of dispersion, shaping or reconstitution is reached, it is preferable to carry out the preliminary operations under subdued light.

The preparation of the collagenous dispersion may be carried out in accordance with the methods well known to those skilled in the art. For example, the raw collagen material previously washed clean of debris, is added to an aqueous acid solution and allowed to soak until it is swollen, the swelling taking place because of the breaking of the hydrogen bonds by the acid. Suitable acids which may be employed for this purpose are: sulfuric, hydrochloric, acetic, citric, lactic, etc. in a concentration from about 0.001 N to about 0.1 N. If desired, an enzyme system such as commercial malt-diastase or ficin may be used to treat the collagen preliminarily to break up elastin and carbohydrate compounds.

As neutralizing agents for reconstitution there may be used organic or inorganic bases such as tertiary amines, alkali metal and alkali earth metal hydroxides, alcoholates, hydrides, amides or hydrocarbon compounds of alkali metals or alkali earth metals. As specific examples there may be included sodium hydroxide, potassium hydroxide, pyridine and, preferably, ammonia.

Suitable dehydrating agents for reconstitution of the gel include inert water-miscible organic solvents as, for example, lower alkanols and ketones, and tertiary amines such as methanol, ethanol, propanol, butanol, pentanol, isopropanol, dioxane, pyridine, methyl-ethyl-ketone, dimethyl-ketone, diethyl-ketone, etc.

Reconstitution of the gel by evaporation is readily accomplished at room temperature, e.g., 20° C. to 30° C. Slightly higher temperatures, i.e., about 30° C. to 40° C., may be used, if caution is exercised to prevent degradation.

The novel dye-photocatalyzed polymers prepared in accordance with this invention may be converted to a variety of useful articles. For example, the polymer may be lyophilized, i.e., vacuum-dried, from the frozen state to form a sponge which is not redispersible in water and which is rapidly (15 to 25 days) absorbable in vivo. Sponges prepared in this manner from the novel polymeric gel may be used for implantation in the body for packing cavities or for hemostatis, or as matrices for tissue culture. If desired, the sponges can be impregnated with drugs such as hemostatic agents, e.g., heparin; hormones, antibiotics, e.g., penicillin, tetracyclines; or wound-healing accelerators, e.g., vitamin C, vitamin A, urea or strepogenins, prior to implantation in the body.

The novel dye-photocatalyzed polymers may be used in the preparation of film for surgical use. To accomplish this, the dispersion containing the dye is spread out in a suitably thick layer in a dish or pan or on a screen, irradiated, and the water allowed to evaporate. Films prepared in this manner show very different characteristics from control films, i.e., those prepared by conventional methods directly from collagen dispersions. Among the unique properties there may be cited: increase in break strength; decreased swelling in water; low shrink temperature; and rapid degradation by proteolytic enzymes.

The novel dye-photocatalyzed polymers may be formed at the time of reconstitution by neutralization of the dispersion or solution. To accomplish this the dispersion or solution containing the dye is exposed to the neutralizing or dehydrating agent and simultaneously irradiated. Conversely, the dye is incorporated into the neutralizing or dehydrating bath and irradiation accompanies application of the neutralizing bath. Sponges, films and fibers may be formed by this method.

The novel dye-photocatalyzed polymers may be formed from previously reconstituted collagenous material. The latter is reconstituted from an acid dispersion or a solution by neutralization and/or dehydration. The reconstituted collagenous material is then irradiated in the presence of dye. Collagenous sponges, films and fibers may be polymerized by this procedure.

It may be stated here that the dye-photocatalyzed polymers of this invention show characteristic behavior in gelation and syneresis tests which provide a basis for distinction from conventional aqueous acid collagenous dispersions. For example, when an acetic acid dispersion of collagen containing a photosensitive dye is exposed to visible light, a rapid partial setting to the gel state occurs. Continued exposure results in greater firmness. On the other hand, control samples without photosensitive dye in the light or with photosensitive dye in the dark remain in a liquid state. This simple comparison clearly establishes the necessity for both a photosensitive catalyst and light. The syneresis phenomenon is manifested when collagenous dispersions are gradually heated. Dispersions containing no photosensitive dye undergo a marked lowering of viscosity to a watery state. Conversely, when collagenous dispersions containing a photosensitive dye are heated, the effect is reflected by the time and intensity of previous irradiation. Nonirradiated samples show liquefaction. Irradiated samples exhibit syneresis with marked separation into a gel phase, which remains set at elevated temperatures as well as at room temperature, and an aqueous phase. The relationship between the degree and permanence of syneresis and the time or intensity of irradiation is quantitative. As used herein, the degree of syneresis is expressed in terms of the percent of liquid expelled from the contracting gel.

The following examples are intended to illustrate the invention but are not to be construed as limitative upon its scope.

*Example I*

Aliquots of collagen dispersion in 0.01 N acetic acid pH 4.0 are prepared (as in Example IV). Riboflavin in aqueous solution is added to give a final concentration of 0.05 mg. percent, 0.5 mg. percent, 5.0 mg. percent or 50 mg. percent riboflavin with a final collagen concentration of 0.3 percent, the percent change in viscosity after one hour irradiation with 400 foot candle power of daylight fluorescent light is recorded.

| Riboflavin concentration, mg. percent | Percent change in viscosity |
|---|---|
| 0.05 | 3 |
| 0.5 | 27 |
| 5.0 | 297 |
| 50.0 | 580 |

*Example II*

Aliquots of a collagen dispersion prepared as in Example IV in 0.01 N acetic acid are adjusted to pH 2.1, 3.1, 4.0 and riboflavin is added. The final concentrations are 0.2% collagen and 1.25 mg. percent riboflavin. The viscosity changes upon irradiation at 26° C. with daylight fluorescent bulbs are recorded.

| | pH 2.1 | Relative Viscosity | |
|---|---|---|---|
| | | pH 3.1 | pH 4.0 |
| Initial, dim light | 5.7 | 44.8 | 264.0 |
| 400 f.c., 60 minutes | 6.98 | 850.0 | Set |

*Example III*

A 0.6% collagen dispersion is prepared from beef tendon by treating with malt-diastase in then dispersed in 0.01 N acetic acid. To 35 gm. of this dispersion 0.7 mg. of riboflavin dissolved in 3.5 ml. of water are added and the dispersion divided into six small Petri dishes. The dispersions are irradiated for the various lengths of time with a tungsten lamp which emits both visible and long ultraviolet light. The intensity of the light at the plane of irradiation is 600 foot candle power. After irradiation the samples are heated to 70° C. for five minutes and the separation of a thermostable gel (syneresis) is observed.

| Sample | Time of Irradiation, Seconds | State at 70° C. | Percent Syneresis |
|---|---|---|---|
| 1 | 0 | Fluid | 0. |
| 2 | 1 | do | 0. |
| 3 | 5 | Soft flocculent gel | Slight. |
| 4 | 10 | Soft scattered masses of gel | Do. |
| 5 | 30 | Single mass of gel | 46. |
| 6 | 60 | do | 46. |

*Example IV*

Two grams of collagen tendon (malt-diastase treated) are dispersed in 200 ml. .01 N. acetic acid. The mixture is homogenized in a Waring Blendor to give a smooth dispersion (0.5% collagen) from which are taken two 50 ml. samples. One sample is used as a control, to the other is added 1 mg. of riboflavin. Each mass is mixed in a Waring Blendor and exposed to sunlight for one hour. Both samples are lyophilized, resulting in the formation of sponges. The control is placed in water. It collapses and after thirty minutes, swells and forms a translucent gel which breaks upon handling. The riboflavin-treated sample is placed in water. It collapses partially, regains its original shape and dimensions, and is able to hold forty-seven times its dry weight of water.

*Example V*

Twenty-five grams of beef tendon slices are placed in 200 ml. of 2% malt-diastase overnight at 37° C. The slices are washed, placed in one liter of 0.01 N acetic acid and homogenized for 30 seconds in a Waring Blendor. The thick mass is run through a Büchner funnel. To 100 grams of the resulting dispersion (0.58% collagen) there is added 2 mg. of riboflavin in 10 ml. of 0.01 N acetic acid and the mixture is hand-mixed. A control of 10 ml. 0.01 N acetic acid in 100 grams of dispersion is also prepared. The dispersions are spread into 15 cm. Petri dishes (30 gm. per dish). One dish of riboflavin-treated collagen is placed in a refrigerator, together with a control, in the dark. Two dishes of riboflavin-treated collagen and two controls are placed at room temperature, 26° C., in room light of 25 foot candle power.

| | Refrigerated, Dark | | 26° C., Light | |
|---|---|---|---|---|
| | Control | Riboflavin-treated | Control | Riboflavin-treated |
| 3 hours | Fluid | Fluid | Fluid | Partially set. |
| 5 hours | do | do | do | Do. |
| 24 hours | do | do | do | Set. |
| 48 hours | do | do | Dried | Dried. |

A strip of the 26° C. light-treated control film and a strip of 26° C. light-treated riboflavin-treated film are suspended in a beaker of distilled water. Small weights just sufficient to keep the films straight are attached to the bottom of each film. The temperature of the water bath is slowly raised. The degree of shrink temperature and amount of contraction are recorded.

| | Original Length, mm. | Contracted Length, mm. | Percent Contraction |
|---|---|---|---|
| Control | 43 | 18 | 58 |
| Riboflavin-treated | 58 | 29 | 50 |

*Example VI*

To 15 grams of a dispersion (0.5% collagen) prepared as in Example V there is added 1.5 ml. of 50% ethanol. To another 15 grams of a similar dispersion there is added 1.5 ml. of 50% ethanol containing 0.26 mg. riboflavin. Both samples are mixed and allowed to stand at room temperature (26° C.) in the dark for two hours. The mixtures are centrifuged to remove air bubbles, and diluted with 30 ml. of 0.01 N acetic acid. The gels are placed in viscosimeters in a 27° C. bath and illuminated with daylight fluorescent bulbs at 400 foot candle power for 17.5 hours. Viscosity measurements show that the control has a relative viscosity of sixteen, the riboflavin-treated gel has a relative viscosity of 166.

*Example VII*

To 100 grams of dispersion (0.5% collagen) prepared as in Example V there is added 2 mg. of riboflavin. Another 100 grams of similar dispersion is used as a control. The dispersions are spread in dishes and placed under light of 400 foot candle power. Another series, including control, is placed under light of 25 foot candle power. Irradiation is maintained for three days, using fluorescent lamps as the source of light. Water is allowed to evaporate from all dishes, the dried film is soaked loose and tested for wet break strength on a Scott tensile strength machine.

| Control, lbs./sq. in. | 400 ft. candle power, lbs./sq. in. | 25 ft. candle power, lbs./sq. in. |
|---|---|---|
| 300 | 2,000 | 2,800 |
| 300 | 1,600 | 1,800 |
| 500 | 950 | 1,800 |

All samples are tested for rate of breakdown when subjected to the papain digestion time test.

Control — Completely digested in 24 hours.
25 foot exposure — Completely digested in 5 hours.
400 foot exposure — Completely digested in 140 seconds.

The papain digestion time test employed is as follows: A 100 ml. volume of a buffer solution containing 174.22 grams dibasic potassium phosphate and 38.15 grams sodium borate made up to one liter of water is mixed with 76 grams thiourea, 800 ml. distilled water and 30 grams papain. Just prior to testing, a 1 ml. volume of an activator made by dissolving 5.2 grams sodium bisulfite in water up to a 100 ml. volume is added to 24 ml. of the buffered papain solution. The film to be tested is immersed under twenty grams of tension in the activated and buffered papain solution, which is maintained at an incubation temperature of 37.8° C. The period of time required for the film to be completely digested represents papain digestion time.

*Example VIII*

To 10 grams of dispersion (0.4% collagen) prepared as in Example II there is added 1 ml. of 50% ethanol containing 0.2 mg. riboflavin. To another 10 grams of a similar dispersion there is added 1 ml. of 50% ethanol containing 0.2 mg. riboflavin-5-phosphate. Both samples are exposed to a 400-foot-candle-power fluorescent lamp for 21 hours and the resulting gels are placed in a viscosimeter.

| | Relative Viscosity | |
|---|---|---|
| | Before Irradiation | After Irradiation |
| Riboflavin | 66 | 400 |
| Riboflavin-5-phosphate | 130 | 335 |

Example IX

Two dispersions (0.81% collagen) of 100 grams each are prepared as in Example V, and 2 mg. riboflavin is added to each. One is exposed to ordinary room light of 100 foot candle power, the other to ultraviolet light at 3000–4000 Angstrom units. Both are irradiated for one hour, and viscosity measurements are taken at 70° C. in centistokes. Parallel controls are also run, and readings taken.

|  | Centistokes |
|---|---|
| No addition of riboflavin, room light | 0.14 |
| Riboflavin added, room light | 0.74 |
| No addition of riboflavin, ultraviolet light | 0.15 |
| Riboflavin added, ultraviolet light | 0.30 |

Example X

A dispersion (0.81% collagen) is prepared and riboflavin is added thereto as in Example IV, in a series of three aliquots and a control for each. One dispersion is irradiated under room light, the second under ultraviolet at 3000–4000 Angstrom units, the third under sunlight. All irradiations last one hour. All samples are then lyophilized to form sponges.

| | |
|---|---|
| Control, room light | Gelatinous, disperses in water. |
| Control, ultraviolet light | Weakly fibrous. |
| Control, sunlight | Gelatinous, disperses in water. |
| Riboflavin, room light | Fibrous, holds 52 times weight of water. |
| Riboflavin, ultraviolet light | Fibrous, holds 39 times weight of water. |
| Riboflavin, sunlight | Fibrous, holds 40 times weight of water. |

Example XI

A series of seven dispersions (0.32% collagen), ten grams each, are prepared as in Example V. One is used as the control. To the remaining six there is added 1 ml. of a solution containing respectively 1 mg., 0.6 mg., 0.2 mg., 0.1 mg. and 0.05 mg. riboflavin. All samples are irradiated for twenty minutes under 400 foot candle power by daylight fluorescent bulbs and then heated to 70° C for twenty minutes. Syneresis measurements are then taken on all samples. Results show that low concentrations are as effective as high concentrations, but are slower, which is expected for catalysis.

| | 5 Minutes' Irradiation | 20 Minutes' Irradiation |
|---|---|---|
| 1 mg. riboflavin | 43% syneresis | 65% syneresis. |
| 0.6 mg. riboflavin | 45% syneresis | 53% syneresis. |
| 0.4 mg. riboflavin | 39% syneresis | 63% syneresis. |
| 0.2 mg. riboflavin | 35% syneresis | 64% syneresis. |
| 0.1 mg. riboflavin | 17% syneresis | 58% syneresis. |
| 0.05 mg. riboflavin | Slight | 61% syneresis. |
| Control | 0 | 0% syneresis. |

Example XII

A dispersion is prepared (0.81% collagen) and riboflavin added thereto as in Example IV. The dispersion is irradiated under room light at 25 foot candle power for one hour and lyophilized to form a sponge. A second dispersion is prepared (as in Example IV) and formaldehyde is added thereto to a concentration of 1%. The dispersion is lyophilized to form a sponge.

The formaldehyde-treated sponges are sterilized by heating at 150° C.; the riboflavin-treated sponges are sterilized by electron beam irradiation. This treatment also serves to remove excess formaldehyde in the formaldehyde-treated sponge. The sponges (1 cm. x 1 cm. x 2 mm. in size) are then implanted subcutaneously in the back region of a series of rats. The animals are autopsied at intervals and time for absorption and disappearance of the sponge is observed.

| | Time for Absorption, Days | Tissue Reaction |
|---|---|---|
| Riboflavin-treated | 15–25 | 1 |
| Formaldehyde-treated | 40–80 | 4–7 |

Tissue Reaction: 0—none, 2—slight, 4—moderate, 6—marked, 8—severe

Example XIII

Three grams of collagen tendon (malt-diastase treated, washed and lyophilized) are placed in 300 ml. of absolute methanol containing 0.036 N sulfuric acid. The product is stored at 2° C. for eleven days with occasional shaking. The material is washed thoroughly with methanol and dialyzed against distilled water for two weeks at 2° C. and dried with acetone. The product, methylated collagen, readily disperses in water.

Six five-grams samples of a 5% dispersion of esterified collagen dissolved in water are prepared, one sample serving as a control. To each of three samples (controls) is added a 0.5 ml. volume of water. To each of the remaining three samples a 0.5 ml. volume of water containing .25 mg. of riboflavin is added. The samples are irradiated under 400 foot candles of daylight fluorescent light, heated at 70° C. for twenty minutes, the degree of syneresis is measured.

| | Control Gel | | Riboflavin Gel | |
|---|---|---|---|---|
| | Before Heating | 70° C. Syneresis | Before Heating | 70° C. Syneresis, Percent |
| 1 min., 400 f.c. | Unchanged | 0 | Soft | 31 |
| 90 min., 400 f.c. | do | 0 | Firm | 71 |
| 3 hrs., 400 f.c. | do | 0 | do | 79 |

Example XIV

A dispersion containing 0.3% collagen is prepared by treating tendon slices with 0.02% ficin, inactivating the ficin with 0.1% hydrogen peroxide and swelling the slices in 0.01 M acetic acid, clarifying by centrifugation, precipitating in acetone and redispersing to form a 0.9% dispersion in 0.1 M acetic acid. The dispersion is extruded through a hypodermic syringe into acetone. The resulting fibers are dried and divided into two lots. One, serving as a control, is placed in phosphate buffer, pH 9.0. The second lot is placed in phosphate buffer pH 9.0 containing 50 mg. percent riboflavin. The two preparations are irradiated for sixteen hours at 200 foot candle power. The degree of cross-linking is determined by stress-strain analysis as adapted to collagen by Wiederhorn et al., J. Am. Leather Chemists, vol. 48, pp. 7–20, 1953. This technique determines the molecular weight between cross-links of polymeric materials. The lower the molecular weight between cross-links, the greater the degree of cross-linking. The results given below are expressed in terms of molecular weight between cross-links.

| | Molecular Weight Between Cross-links | Average Number of Cross-links/Tropocollagen Unit of 360,000 m.w. |
|---|---|---|
| Control | 151,000 | 2.4 |
| Riboflavin-treated | 21,000 | 17.1 |

In like manner, fibers prepared by the procedure described above are subjected to treatment under the same conditions, including controls, except that other dyes are substituted for the riboflavin. The results are given below.

| Dye | Concentration (mg. percent) | Molecular Weight Between Cross-links | Average Number of Cross-links/ Tropocollagen Unit of 360,000 m.w. |
|---|---|---|---|
| Control | | 21,400 | 16.9 |
| Pheno-safranin | 5.0 | 11,600 | 31.1 |
| Rose bengal | 5.0 | 11,500 | 31.2 |
| Methylene blue | 5.0 | 10,300 | 35.0 |
| Azure A | 5.0 | 10,200 | 35.3 |
| Toluidine blue O | 5.0 | 11,100 | 32.6 |
| Eosin Y | 5.0 | 13,200 | 27.2 |
| Control | | 30,800 | 11.8 |
| Evans Blue | 5.0 | 17,900 | 20.2 |
| Methylene green | 5.0 | 16,900 | 21.4 |
| Amethyst violet | 5.0 | 11,700 | 30.8 |
| Control | | 67,000 | 5.4 |
| Lumazine | 5.0 | 27,000 | 13.4 |
| Thionine | 5.0 | 5,600 | 65.0 |
| Control | | 17,500 | 20.6 |
| Xanthopterin | 10.0 | 10,800 | 33.3 |
| 2,3,5-triphenyl-tetrazolium Cl | 1.0 | 9,500 | 38.0 |
| Acridine red | 1.0 | 9,600 | 37.8 |
| Acridine orange | 1.0 | 6,800 | 53.0 |
| Proflavine | 1.0 | 7,400 | 48.8 |
| Resazurin | 1.0 | 6,700 | 53.7 |
| Azure B | 1.0 | 7,000 | 51.0 |
| Bindschedler's green | 10.0 | 9,600 | 37.8 |
| Primuline | 1.0 | 8,300 | 44.0 |
| Acridine yellow | 10.0 | 7,500 | 48.0 |
| Control | | 41,100 | 8.7 |
| Neutral red | 5.0 | 11,700 | 30.7 |
| Erythrosine | 5.0 | 10,100 | 35.5 |
| Fluorescein | 5.0 | 19,200 | 18.7 |
| Malachite green | 5.0 | 28,600 | 12.6 |

*Example XV*

Films are prepared from 0.3% collagen dispersed in 0.01 M acetic acid after treatment with 0.02% ficin and inactivation of the ficin with 0.1% hydrogen peroxide. The control film is prepared by spreading the dispersion on a screen and neutralizing with a spray of ammonium hydroxide, then air drying under 200 foot candle illumination. A second film is prepared by incorporating 30 mg. of riboflavin dissolved in 60 ml. of water into 600 gm. of dispersion. The dispersion is spread on a screen, neutralized by spraying with ammonium hydroxide, and then irradiated with 200 foot candles during drying. A third film is prepared by adding 51 mg. riboflavin dissolved in 108 ml. water to 1,080 gm. of dispersion. The dispersion is spread on a screen and irradiated for sixteen hours with 200 foot candles of light and then neutralized with a spray of ammonium hydroxide and allowed to dry. The molecular weights between cross-links are given below.

Control _____ 1,191,000
Riboflavin—neutralized—then irradiated ____ 22,200
Riboflavin—irradiated—then neutralized ____ 50,600

Three pieces, 2″ by 5″ in size of the control film (supra) are subjected to irradiation in riboflavin solutions (50 mg. percent), and buffered with 0.1 M phosphate at pH 5.0, 7.0 and 9.0, under 200 foot candle power for a period of twenty-three hours. The degree of cross-linking is determined by stress-strain analysis.

| | Molecular Weight Between Cross-links | Cross-links/ 360,000 |
|---|---|---|
| pH 5.0 | 111,000 | 3.25 |
| pH 7.0 | 18,600 | 19.4 |
| pH 9.0 | 9,750 | 37.0 |

*Example XVI*

Twenty-five grams of tendon slices in 250 ml. of a 1% saline solution are agitated in the cold (4° C.) for twenty-fours hours. The solution is separated by decantation and a sufficient quantity of sodium chloride is added with stirring to bring the solution to 23% salt concentration. Stirring is continued until all of the salt goes into solution, and the solution is allowed to stand at 4° C. for about twelve hours. A gel-like precipitate of collagen accumulates at the surface which is separated from the clear liquid by centrifugation. It is then dissolved in sufficient 1% saline to make a 0.5% concentration.

To two grams of the above solution are added 0.5 ml. of distilled water as a control. To another 2 grams of the above solution are added 0.5 ml. of distilled water, containing 0.06 mg. riboflavin. Both preparations are placed in sunlight of 800 foot candle power. The control remains fluid for thirty minutes. The riboflavin-containing solution sets to a firm gel within one minute. Both are heated to 70° C. for twenty minutes. The control remains fluid whereas the riboflavin preparation synereses into a liquid phase and gel phase with 38% syneresis.

*Example XVII*

Commercial gelatin is spray-dried by conventional means to form a finely divided powder. To a 10 ml. volume of a 2% solution of this gelatin in warm water is added a 0.5 mg. quantity of riboflavin dissolved in 1 ml. water. One ml. of water is added to a control sample. The two samples are irradiated for sixteen hours with 400 foot candles of light and then heated to 70° C. The control sample liquefies. The riboflavin-treated sample remains set.

*Example XVIII*

0.5 gm. films of purified pigskin gelatin with an isoelectric point of 8.92 are placed in 10 ml. of 0.1 M Na$_2$HPO$_4$ buffer pH 8.6 containing 5.0 mg. of riboflavin-5-phosphate. Samples of each are irradiated with 400 foot candle power light from daylight fluorescent bulbs for sixteen hours. Control samples are kept in the dark. All films are then placed in water and heated to 100° C. for sixty minutes.

| Bath | Treatment | Effect of Heating to 100° C. for 60 minutes |
|---|---|---|
| Buffer | Dark | Melted. |
| Do | 400 f.c. light | Do. |
| Buffer Riboflavin | Dark | Do. |
| Do | 400 f.c. light | Film intact and firm. |

*Example XIX*

Films of purified pigskin gelatin with an isoelectric point of 8.92 are placed in 0.1 M Na$_2$HPO$_4$ buffer containing 50 mg. percent riboflavin-5-phosphate and irradiated at 400 foot candle power with daylight fluorescent bulbs for sixty minutes, then removed from the solution and air-dried at room temperature under continued irradiation. The molecular weight between thermostable cross-links is determined by stress-strain analysis at 92° C. The average molecular weight between cross-links in the polymer is 162,000. Control films melt.

*Example XX*

2.5 gm. of purified pigskin gelatin (isoelectric point 8.92) are dissolved in 50 ml. of 0.1 M Na$_2$HPO$_4$ containing 25 mg. of riboflavin-5-phosphate by heating in the dark. The solution is cooled, beaten to a foam in a Waring Blendor and stored for about sixteen hours at 2° C. It is then irradiated by means of 400 foot candle daylight fluorescent bulbs at room temperature (26° C.). The foam dried simultaneously during irradiation.

The dried foam forms a resilient sponge which does not melt when heated to 100° C. in water. The sponge wets rapidly and has a water-holding capacity of:

30 times its weight for 10 seconds' drain time.
28 times its weight for 30 seconds' drain time.
24.5 times its weight for 60 seconds' drain time.

Example XXI

A collagen dispersion prepared as in Example XV is diluted with distilled water to give 0.03% collagen in 0.0005 N acetic acid. One aliquot serves as a control. To a second aliquot is added 5 mg. of riboflavin-5-phosphate. Both samples are irradiated with 200 f.c. of light from daylight fluorescent bulbs for two hours. The samples are then examined and photographed under a Zeiss phase contrast microscope at room temperature and then at intervals while the temperature of the preparation is maintained at 46–61° C. Both preparations initially show numerous fibrils approximately one micron in diameter averaging about 100 microns long. When heated to 56–61° C. the fibrils of the control preparation slowly become less visible and break up into bead-like segments before finally disappearing. The riboflavin-5-phosphate-treated fibrils remain intact and unchanged in appearance. (See FIGURES 1 to 5.)

Example XXII

To 10 grams of collagen dispersion, prepared as in Example XV and containing 0.6% collagen in 0.01 N acetic acid, is added 5 mg. of riboflavin-5-phosphate dissolved in 5 ml. of water. The dispersion is irradiated with 200 f.c. of light from daylight fluorescent bulbs for two hours. The dispersion rapidly sets to a firm gel. The gel is broken up into small pieces in water, examined and photographed under a Zeiss phase contrast microscope. Most of the fibrils are fastened together in bundles of closely packed parallel fibrils (see FIGURE 4). The fibrils do not separate from the bundles under moderate stress. Under more severe stresses the bundles would shear into smaller bundles of fibrils. When heated to 56–61° C. for forty minutes, the bundles of fibrils remain intact and unchanged in appearance. The control dispersion contains separate, randomly oriented fibrils. These slowly disintegrate upon heating to 56–61° C. (See FIGURES 6 and 8).

Example XXIII

Collagen strands prepared by extruding acid dispersed collagen into an acetone-ammonia bath are used as the starting material. Strands weighing 22.8 mg. are placed in one ml. of a solution containing 50 mg. percent riboflavin-5-phosphate in 0.1 N disodium phosphate plus the indicated radioactive amino acid. The samples are irradiated with 200 foot candles of light from daylight fluorescent bulbs for sixteen hours. Control samples are kept in the dark for the same period of time. The samples are then washed in twenty changes of cold water plus three changes of 70° C. water to remove unbound amino acid. The samples are dissolved in one ml. of hyamine hydroxide solution and 10 ml. of toluene containing 0.3% 2,5-diphenyloxazole and 0.1% p-1-bis-2-(5-phenyloxazolyl)-benzene as scintillators. Carbon$^{14}$ is measured in a scintillation counter. Results are shown below.

| Amino Acid | $\mu$Moles of Amino Acid Added | Percent of Added Amino Acid Bound by Collagen | |
|---|---|---|---|
| | | Dark | Illuminated |
| Tyrosine 2 $C^{14}$ | 0.41 | 3.4 | 71.0 |
| L-Methionine, Methyl $C^{14}$ | 0.17 | 5.5 | 44.4 |
| DL Methionine, 2 $C^{14}$ | 1.93 | 0.3 | 7.2 |
| Glycine 2 $C^{14}$ | 0.13 | 6.3 | 31.2 |
| Glycine 1 $C^{14}$ | 0.11 | 2.0 | 11.5 |
| DL Histidine 2 $C^{14}$ | 0.95 | 1.6 | 10.5 |
| L Aspartic Acid, 2-3 $C^{14}$ | 0.25 | 1.6 | 6.5 |
| DL Alanine, 1 $C^{14}$ | 0.5 | 0.2 | 1.0 |

What is claimed is:

1. A method for preparing an irreversibly cross-linked, thermostable collagenous polymer which comprises the step of irradiating a collagenous starting material in the presence of a photosensitive dye photocatalyst.
2. A method as set forth in claim 1 wherein the starting material is in the form of an acid dispersion.
3. A method as set forth in claim 1 wherein the starting material is in the form of an aqueous solution.
4. A method as set forth in claim 1 wherein the starting material is esterified collagen.
5. A method as set forth in claim 1 wherein the starting material is a collagen derivative.
6. A method as set forth in claim 1 wherein the starting material is a collagen derivative formed in situ during the photocatalytic reaction by photocatalysis.
7. A method as set forth in claim 1 wherein the starting material is native collagen.
8. A method as set forth in claim 1 wherein the starting material is partially degraded collagen.
9. A method as set forth in claim 1 wherein the starting material is gelatin.
10. A method as set forth in claim 1 wherein the starting material is reconstituted collagen.
11. A method as set forth in claim 1 wherein the starting material is reconstituted collagen in the form of a film.
12. A method as set forth in claim 1 wherein the starting material is reconstituted collagen in the form of a fiber.
13. A method as set forth in claim 1 wherein the starting material is reconstituted collagen in the form of a sponge.
14. A method as set forth in claim 1 wherein the starting material is reconstituted collagen in the form of a filament.
15. A method as set forth in claim 4 wherein the esterified collagen is dispersed in water.
16. A method as set forth in claim 1 wherein the irradiation is carried out under natural light.
17. A method as set forth in claim 1 wherein the irradiation is carried out under artificial light.
18. A method as set forth in claim 1 wherein the irradiation is carried out at a wave length of from about 2500 to about 6000 Angstrom units.
19. A method as set forth in claim 1 wherein the irradiation is carried out at an intensity of from about 10 to about 13,000 foot candle power.
20. A method as set forth in claim 1 wherein the catalyst is photosensitive 6,7-$(R,R_1)$-9-$(1'-X)$ isoalloxazine, $R$ and $R_1$ being, interchangeably, members selected from the group consisting of hydrogen atoms and lower alkyl radicals, and X is a member selected from the group consisting of ribityl, phosphoribityl, monoacetoribityl, polyacetoribityl, malonyl, the water-soluble salts and dinucleotide derivatives thereof.

References Cited in the file of this patent

UNITED STATES PATENTS

| | | |
|---|---|---|
| 2,494,041 | Frame | Jan. 10, 1950 |
| 2,507,244 | Correll | May 9, 1950 |
| 2,850,445 | Oster | Sept. 2, 1958 |
| 2,923,673 | Munger | Feb. 2, 1960 |
| 2,948,706 | Schellenberg et al. | Aug. 9, 1960 |

OTHER REFERENCES

Oster: Photographic Engineering, volume 4, No. 3 (1953), pages 176 and 177.

UNITED STATES PATENT OFFICE
CERTIFICATE OF CORRECTION

Patent No. 3,152,976                             October 13, 1964

Elois Kuntz

It is hereby certified that error appears in the above numbered patent requiring correction and that the said Letters Patent should read as corrected below.

Column 3, line 30, for "irradation" read -- irradiation --; column 4, line 19, for "certification" read -- esterification --; column 5, line 37, for "7-oxo-" read -- 7-oxy- --.

Signed and sealed this 16th day of February 1965.

(SEAL)
Attest:

ERNEST W. SWIDER                             EDWARD J. BRENNER
Attesting Officer                                Commissioner of Patents